(12) United States Patent
Norris

(10) Patent No.: US 8,964,502 B2
(45) Date of Patent: Feb. 24, 2015

(54) ZERO OFFSET PROFILE FROM NEAR-FIELD HYDROPHONES

(75) Inventor: Michael W. Norris, Cypress, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 785 days.

(21) Appl. No.: 12/695,685

(22) Filed: Jan. 28, 2010

(65) Prior Publication Data

US 2011/0063947 A1    Mar. 17, 2011

Related U.S. Application Data

(60) Provisional application No. 61/164,208, filed on Mar. 27, 2009.

(51) Int. Cl.
*G01V 1/38*    (2006.01)

(52) U.S. Cl.
CPC ................................ *G01V 1/3808* (2013.01)
USPC ............................................... 367/21; 367/15

(58) Field of Classification Search
CPC ....... G01V 1/48; G01V 1/364; G01V 1/3808; G01V 2210/57
USPC ............. 702/14, 16, 9, 17, 57, 182, 188, 189; 367/21, 23, 43, 56
See application file for complete search history.

(56) References Cited

U.S. PATENT DOCUMENTS

| | | | | |
|---|---|---|---|---|
| 6,049,760 A * | 4/2000 | Scott | ................................ | 702/14 |
| RE38,229 E * | 8/2003 | Marfurt et al. | ................... | 702/16 |
| 7,551,515 B2 * | 6/2009 | Christie et al. | ................... | 367/21 |
| 8,050,867 B2 | 11/2011 | Johnson et al. | | |
| 8,162,297 B2 | 4/2012 | Norris et al. | | |
| 8,276,889 B2 | 10/2012 | Norris et al. | | |
| 2008/0175102 A1 | 7/2008 | Hegna et al. | ................... | 367/144 |
| 2010/0182870 A1 | 7/2010 | Norris et al. | | |
| 2010/0188930 A1 | 7/2010 | Johnson et al. | | |

FOREIGN PATENT DOCUMENTS

| | | | | |
|---|---|---|---|---|
| GB | 2172997 | 10/1986 | ............. | G01V 1/137 |
| WO | WO2008/025944 | 3/2008 | ............... | G01V 1/38 |

OTHER PUBLICATIONS

Brink et al. (1999) "The value of near field hydrophone measurements for monitoring source signature variations," EAGE 61st Conference Expanded Abstracts, session 6-09, 4 pgs.

Amundsen, L. (2000) "Linear Inversion for Source Signatures From Ministreamer Data," *The Leading Edge* 19, pp. 40-43.

Hargreaves, N. (1984) "Far-field signatures by wave field extrapolation," *SEG Expanded Abstracts* 3, pp. 290-291.

Kragh, E. et al. (2000) "Source Signature Estimation—Attenuation of the Sea-Bottom Reflection Error From Near-Field Measurements," *First Break* 18, pp. 260-264.

(Continued)

*Primary Examiner* — Daniel L Murphy

(74) *Attorney, Agent, or Firm* — ExxonMobil Upstream Research Company Law Dept.

(57) ABSTRACT

Method for acquiring zero offset data from a marine seismic survey. Seismic data are recorded using source signature monitor receivers located very near the air guns or other sources (81). The recorded data are sorted into common-source gathers (82). A common trace is computed that is common to each gather (83). The common trace is subtracted from each trace in each gather (84), resulting in approximately zero-offset data.

15 Claims, 6 Drawing Sheets

(56) References Cited

OTHER PUBLICATIONS

Parkes, G. E. et al. (1984) "The Signature of an Air Gun Array: Computation From Near-Field Measurements Including Interactions—Practical Considerations," *Geophysics* 48, pp. 105-111.

Ziolkowski, A. M. et al. (1997) "Marine Seismic Sources: QC of Wavefield Computation From Near-Field Pressure Measurements," *Geophysical Prospecting* 45, pp. 611-639.

EP Search Report dated Nov. 5, 2009, 5 pages.

\* cited by examiner

ZERO OFFSET PROFILE FROM NEAR-FIELD HYDROPHONES

CROSS-REFERENCE TO RELATED APPLICATIONS

This application claims the benefit of U.S. Provisional Patent Application Ser. No. 61/164,208, filed 27 Mar. 2009, the disclosures of which are hereby incorporated herein in their entirety by reference.

FIELD OF INVENTION

The invention relates generally to the field of geophysical prospecting and, more particularly, to marine seismic surveying and processing of the measured data. Specifically, the invention is a method for extracting near-zero offset traces from the signals recorded on near-field sensors that are typically embedded in air gun arrays.

BACKGROUND OF INVENTION

Subsurface reflection imaging as currently practiced in the oil industry attempts to generate an equivalent zero-offset seismic trace by combining the energy observed at many receiver locations. Because of the source and receiver geometries used for marine seismic data acquisition, a seismic trace is never recorded at the zero offset. This is true for marine streamer, Ocean Bottom Cable (OBC) and Ocean Bottom Seismometer (OBS) acquisition geometries. Recording a zero offset or a very nearly zero offset seismic trace allows for more accurate trace interpolation for such processes as AVO (amplitude vs. offset) analysis and SRME (surface reflection multiples elimination), allows the identification of near surface reflections and diffractions and possibly allows multiple generators to be identified. The advantage of recording zero-offset seismic traces has long been recognized. In patent GB2172997, Mathison describes a method that allows the recording of zero-offset data. However, Mathison's method is designed for 2D seismic acquisition.

The vast majority of today's marine seismic acquisition utilizes 3D geometries. FIG. 1 shows a schematic plan view of a conventional 3D marine streamer setup. Vessel 11 tows seismic sources in the form of air gun arrays 12, and also tows receivers in the form of seismic sensor cables 13. FIG. 2 shows a schematic plan view of a conventional 3D OBC acquisition setup. Because of the hardware used to tow multiple seismic streamer cables (FIG. 1), the distance between the center of the source array and center of the nearest receiver group is typically 100 to 150 m. For OBC seismic acquisition, the source arrays are towed over and/or between the seismic cables 21 (FIG. 2). This has the potential to provide zero-offset traces; but shooting a seismic source directly over an OBC sensor can be expected to overdrive the sensor. Because of the potential for overdriving the sensors and because of other geometric advantages, OBC source points are typically located between the OBC receivers. Consequently the nearest source to receiver offsets available with OBC acquisition geometries are on the order of 25 m to 50 m.

Typically marine seismic sources for streamer, OBC and OBS acquisition utilize two air gun arrays, as shown in both FIG. 1 and FIG. 2. The two air gun arrays are shot alternately (i.e. flip-flop fashion) during acquisition of seismic data. Each of the air gun arrays is typically composed of two to four air gun strings 14. Each air gun string typically has five to ten air gun stations. A single air gun or a cluster of air guns is located at each air gun station. Such an air gun array arrangement is schematically shown in FIG. 3. FIG. 3 depicts a single air gun array composed of three air gun strings 31 with seven air gun stations 32 on each air gun string with a near-field sensor 33 located at each air gun station.

As depicted in FIG. 3, common practice is for a sensor to be located at each air gun station. In current practice, the sensor is typically a dynamic pressure sensor which is referred to as a near-field hydrophone. The name near-field hydrophone, NFH, is an obvious simplification since each sensor embedded in an air gun array measures a myriad of signals when any or all of the air guns are fired. The name "near-field hydrophone" has come to be synonymous with any dynamic sensor placed approximately 1 m from the air gun ports that is used to measure pressure and/or particle motion or to measure analogs of pressure and/or particle motion. The term near-field is thus meant, among other things, to exclude the survey sensors 13 and 21.

Near-field sensors are included in air gun arrays as one means of verifying the quality and consistency of the source signature generated by the air gun array (Parkes 1982, Ziolkowski 1997, Brink 1999, Hegna US20080175102). Examples of near-field hydrophone signals from two consecutive shots are shown in FIG. 4. The data in FIG. 4 were generated using the air gun arrangement of FIGS. 1 and 2: two air gun arrays, each array having three strings. The traces in FIG. 4 were gained using a common scalar so the signal amplitudes are relative from trace to trace. It is clear from this display that both the near-field hydrophones associated with the source array being fired (i.e. the active array) and the near-field hydrophones associated with source array that will be fired next (i.e. the inactive array) are dominated by the direct arrivals from the air guns being fired, including the air bubbles for the sensors associated with the active array. The direct arrivals from firing of the port array can be seen on FIG. 4 at 41-44, being respectively direct arrivals at string S6 (41), at string S5 (42); at string S4 (43); and at strings S1, S2 and S3 (44). The air bubble responses can be seen within ovals 45 (bubble at strings S4, S5 and S6 from firing of the port array) and 46 (bubble at strings S1, S2 and S3 from firing of the port array). These direct arrivals obscure the subsurface reflections, hints of which may be seen in the area 47 after time=100 ms for the sensors associated with the inactive array. (The horizontal axis scale is time in ms.)

One particularly effective means of using the near-field sensors to quality control air gun arrays is on a shot by shot basis to vertically sum (i.e. vertical sum and vertical stack are synonymous signal processing techniques where common time samples from two or more times series are summed or averaged together to create an output time series) the signals from the near-field sensors associated with the active array and then to display these summed signals in a density style display with the signals sorted into port and starboard order. This type of analysis is shown in FIG. 5. The variations between the port and starboard arrays are associated with variations in the individual near-field hydrophones and the condition of their associated analog signal paths. For this type of display, any significant variations in the array geometry or variations in individual air gun output will result in easily identified discontinuities in the display.

A comparable type of analysis can be done using the near-field hydrophones associated with the inactive array (FIG. 6). This type of display is typically not generated because after the arrival of the direct arrivals from the active array, the display is contaminated with what appear to be signals associated with the water bottom and the subsurface geology. The contamination of air gun source signatures by the water bottom reflection in shallow waters is well known for near-field hydrophones (Ziolkowski 1997 and Kragh 2000) and for mini-streamers (Hargreaves 1984 and Amundsen 2000).

SUMMARY OF THE INVENTION

FIG. 7 is an inline view of a vertical cross section of a typical air gun source using two air gun arrays. If the active air gun array is treated as a single source and the near-field hydrophones associated with the active and inactive air gun arrays are treated as two receiver sets, then each activation of a source array defines two common midpoint locations. One midpoint location is directly below the active air gun array and the other is halfway between the two air gun arrays. Thus, sensor(s) embedded in the active array will record almost exactly zero-offset data, whereas the sensor(s) embedded in the inactive array will record data corresponding to an offset of maybe about 25 m; but the inactive array record will be less dominated by direct arrivals and bubble response because of the spherical spreading loss associated with the distance between the active and inactive arrays.

An ability to extract the zero-offset trace, which is what the present invention provides, is of value for 2D and 3D marine streamer seismic acquisition. An even greater value is derived for 3D OBC and 3D OBS acquisition because these acquisition techniques use many times more shots per square kilometer than streamer acquisition. Having many more shots provides the ability to not only compute zero-offset traces; but it also provides sufficient data to generate a high density, zero-offset data volume.

The near-field hydrophone signals associated with the inactive air gun array shown in FIG. 4 exhibit travel time delays. For each shot, it is possible to treat all of the individual near-field hydrophones as a small 3D receiver spread. Doing so would allow standard seismic processing to be applied to the near-field hydrophone signals associated with the active and inactive air gun array to create seismic traces for the two common locations shown in FIG. 7. In practice, standard seismic processing does not work well when applied to the near-field hydrophones associated with the active air gun array. The direct air gun arrivals are too large to be adequately attenuated. Standard seismic processing techniques will work when applied to the near-field hydrophones associated with the inactive air gun array; but the quality of the profile is significantly degraded by the level of standard seismic processing that must be applied to adequately attenuate the direct arrivals from the active air gun array. The present invention does not apply standard seismic processing techniques for the reasons discussed above.

An alternate approach is described by Kragh (PCT Patent Application Publication No. WO2008/025944A1) where an adaptive beamforming operation is used to isolate an initial or raw approximation of the zero-offset data set, then further processing steps are used to remove the near-field effects of the active air gun array from the data. As with the standard seismic processing approach, Kragh's approach is limited by the attenuation and discrimination provided by the adaptive beamforming operation.

By acquisition specifications, the depth of the air guns, the inter-string geometry, the intra-string geometry, the air pressure and volume, individual air gun timing and the individual gun volumes are tightly constrained during acquisition of seismic data. The only unconstrained factor that affects the source array signature is the reflection coefficient of the ocean's surface which can be expected to change slowly as a function of time. Observation of production seismic data has shown that when the primary air gun parameters are tightly constrained, the air gun signatures are stable over long spatial distances and time intervals. The stability of the air gun signatures was addressed by Parkes (Parkes 1984) and is demonstrated by the consistent amplitude and timing characteristics of the summed near-field hydrophones shown in FIG. 5.

The present inventive method's extracting of the zero-offset data takes advantage of the high level of constraint associated with air gun sources by estimating the signal that is most common to a near-field sensor or some set of near-field sensors and removing the common signal from the individual near-field sensor signals. The primary signals recorded at each near-field sensor are: 1) the direct arrivals (i.e., the initial pressure peak and the bubble response) from each of the active air guns, 2) the surface reflection, 3) the water bottom reflection and 4) the reflections and diffractions from the subsurface geology. These signals are listed from the signal with the largest magnitude to the signal with the smallest magnitude. This ordering also corresponds to ordering the signals recorded at the near-field sensors from the signal with the most spatial coherency to the signal with the least spatial coherency. Given this ordering, if the average or median or first principal component of the near-field sensor signal is computed over a significant spatial distance, the computed average or median or first principal component will be dominated by the most coherent (i.e. most common) signal recorded by the near-field sensor. In general, the median near-field sensor signal is a better estimate because the median calculation inherently excludes outliers.

The present inventive method is described herein in terms of an air gun source array; but it is equally applicable to any marine source where the source parameters are tightly constrained during seismic data acquisition and the source is made up of a collection of individual elements (i.e. the method is also applicable to water guns, sleeve guns, vibratory sources, etc.). The air gun arrays used in the examples are configured to align the initial pressure peak (i.e. tuning on the peak); but the invention is equally applicable to other air gun tuning techniques such as tuning on the bubble or Sosie style sources (i.e. pseudo-random impulse). The method can be partly or entirely automated to be performed on a programmed computer.

In one embodiment, the present invention is a method for acquiring zero-offset seismic data from a marine survey, said method comprising:

(a) obtaining seismic data from a survey wherein the survey used one or more monitor receivers to monitor source signature, and the data obtained comprise a record from each monitor receiver, each record including data for two or more source-receiver offsets;

(b) estimating a common signal present in each seismic data record; and (c) removing the estimated common signal from each seismic data record, thereby generating at least one record of substantially zero-offset data.

BRIEF DESCRIPTION OF THE DRAWINGS

The present invention will be better understood by referring to the following detailed description and the attached drawings in which:

FIGS. 5-6 and 9-10 are black and white reproductions of color displays.

The invention will be described in connection with example embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 8:
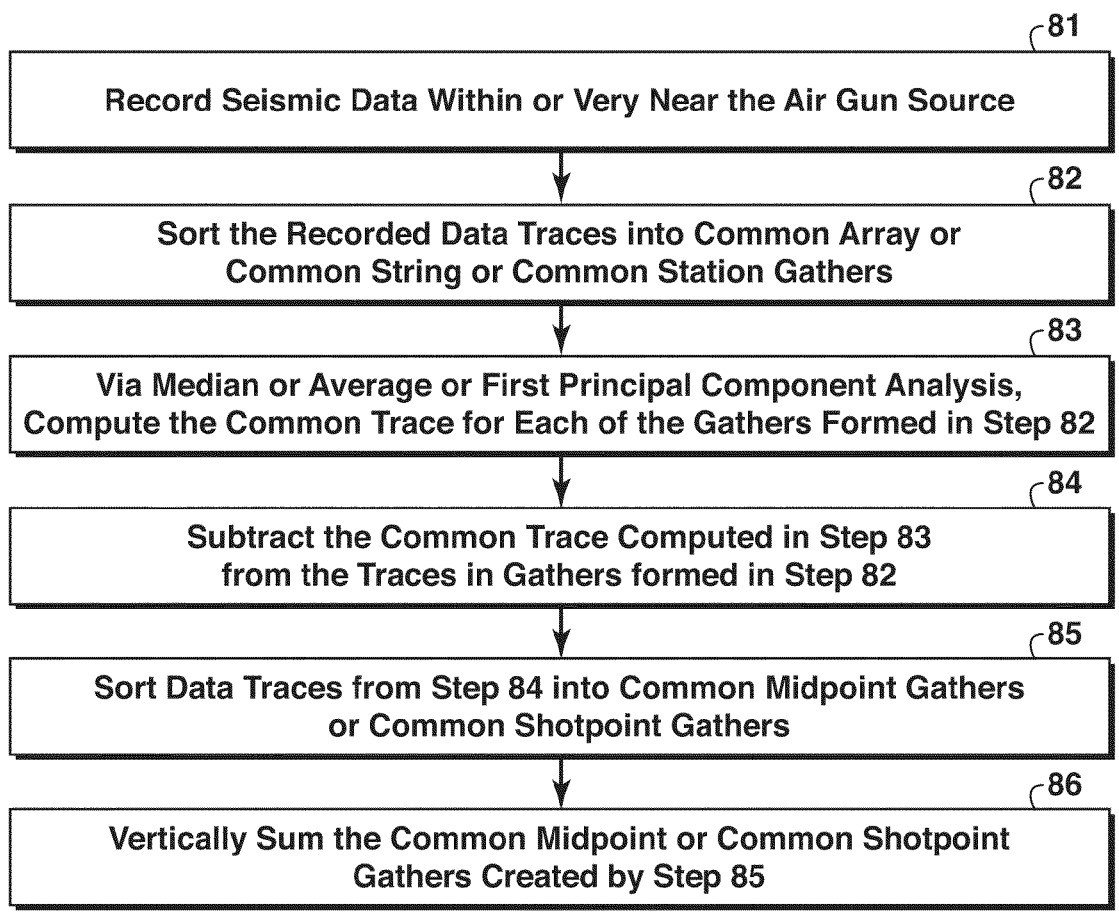
FIG. 8 is a flow chart showing basic steps in one embodiment of the present inventive method for creating near-zero offset seismic profile from sensors embedded in the air gun source.

FIG. 8 is a flow chart showing basic steps in one embodiment of the present inventive method for extracting the near-zero offset data from signals recorded by near-field sensors embedded in a seismic air gun source. Since the air gun source array with the embedded near-field sensors is being towed through the water, the location of the near-field sensors is somewhat spatially displaced with respect to the location where the air guns were fired. Typically air gun arrays are towed through the water at 5 knots (2.5722 m/s). For nominal water velocities, a water depth of 100 m and a towing speed of 5 knots, the near-field sensors would be displaced 0.34 m from the zero offset location. Although this distance is non-zero, the term zero-offset will be used because seismic data measurements at this very near zero offset distance are a significant improvement over the 25 m to 150 m offsets that are available from typical production seismic geometries.

Since the present inventive method depends on spatial coherency to isolate the most common signals recorded by the near-field sensors, a statistically significant number of shots must be acquired before the zero-offset can be extracted. At step 81, such data are recorded at the near field sensors in both active and inactive arrays. Once sufficient data are available, the signals from the near-field sensors are sorted (Step 82). The type of sort gather used is dependent on the number of near-field sensors and their positioning within the air gun arrays. Preferably every gun station should have a near-field sensor positioned near it. This arrangement allows the near-field sensors to be sorted into common air gun station order while still providing a statistically significant number of traces for computation of the common signal. Another natural sort order for the active and inactive air gun arrays is to sort the near-field sensors into common string order. A third sort gather that can be used is to sort the near-field sensors into common air gun array order. The common array sort order will work for the active array; but the effectiveness of the common signal estimation is degraded by the travel time differences observed for the inactive air gun strings. Persons skilled in the technical field will know of other gathers that can be used in the invention, such as super sets (multiple shots) or subsets (each string or sensor station is treated as a unique location) of the aforementioned. Having more traces in a gather tends to improve signal-to-noise, but the trade-off is more spatial uncertainty associated with the computed zero-offset data.

Once the near-field sensor traces have been sorted, at step 83 the common signal is estimated for each of the sort gathers. This is done by, for example, computing the average trace value as a function of time, or the median trace value as a function of time, or the first principal component. The median trace may be preferred because the median computation is less affected by outliers. Other methods such as trimmed means or trimmed medians can also be employed to compute the estimate of the common signal. As an example of picking the median or average trace, consider the direct arrivals within oval 41 in FIG. 4. There are seven or eight traces within the oval. Selecting a median trace or computing an average trace to represent this direct arrival is straightforward. One would then do the same for the other direct arrivals and for the bubbles. The common signal that is estimated in step 83 is in this example the sum of the traces selected or computed from ovals 41-46.

Figure 1:
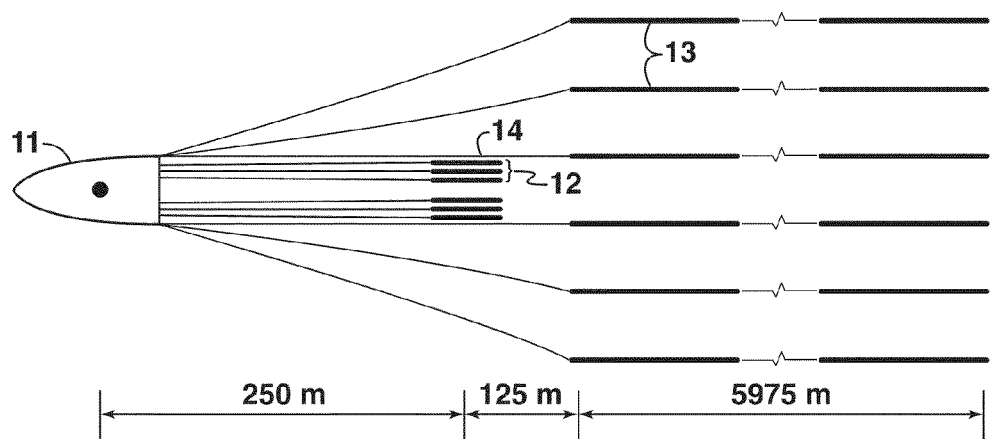
FIG. 1 is a schematic view of marine streamer seismic data acquisition geometry.
Figure 2:
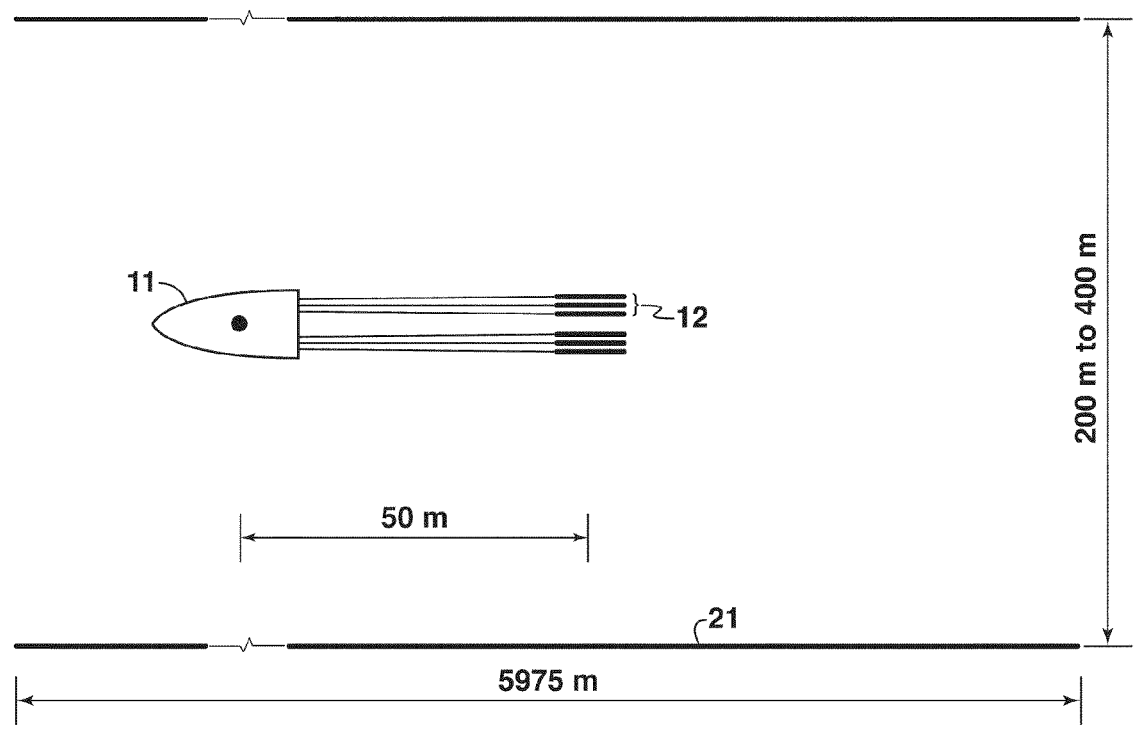
FIG. 2 is a schematic view of OBC data acquisition geometry.
Figure 3:
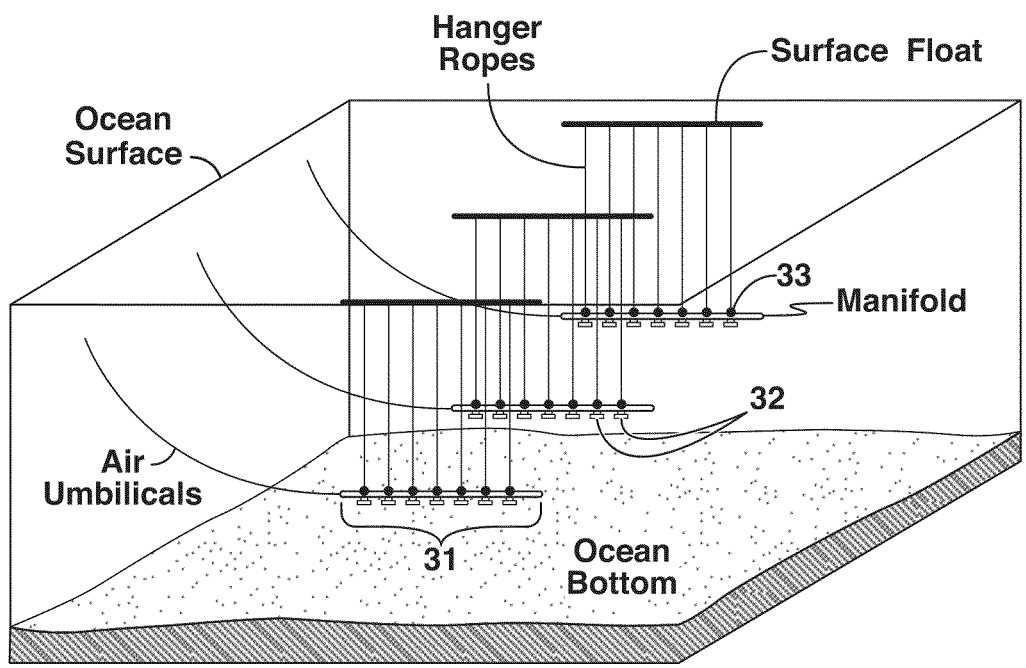
FIG. 3 is a schematic view of air gun array with near-field hydrophones.
Figure 4:
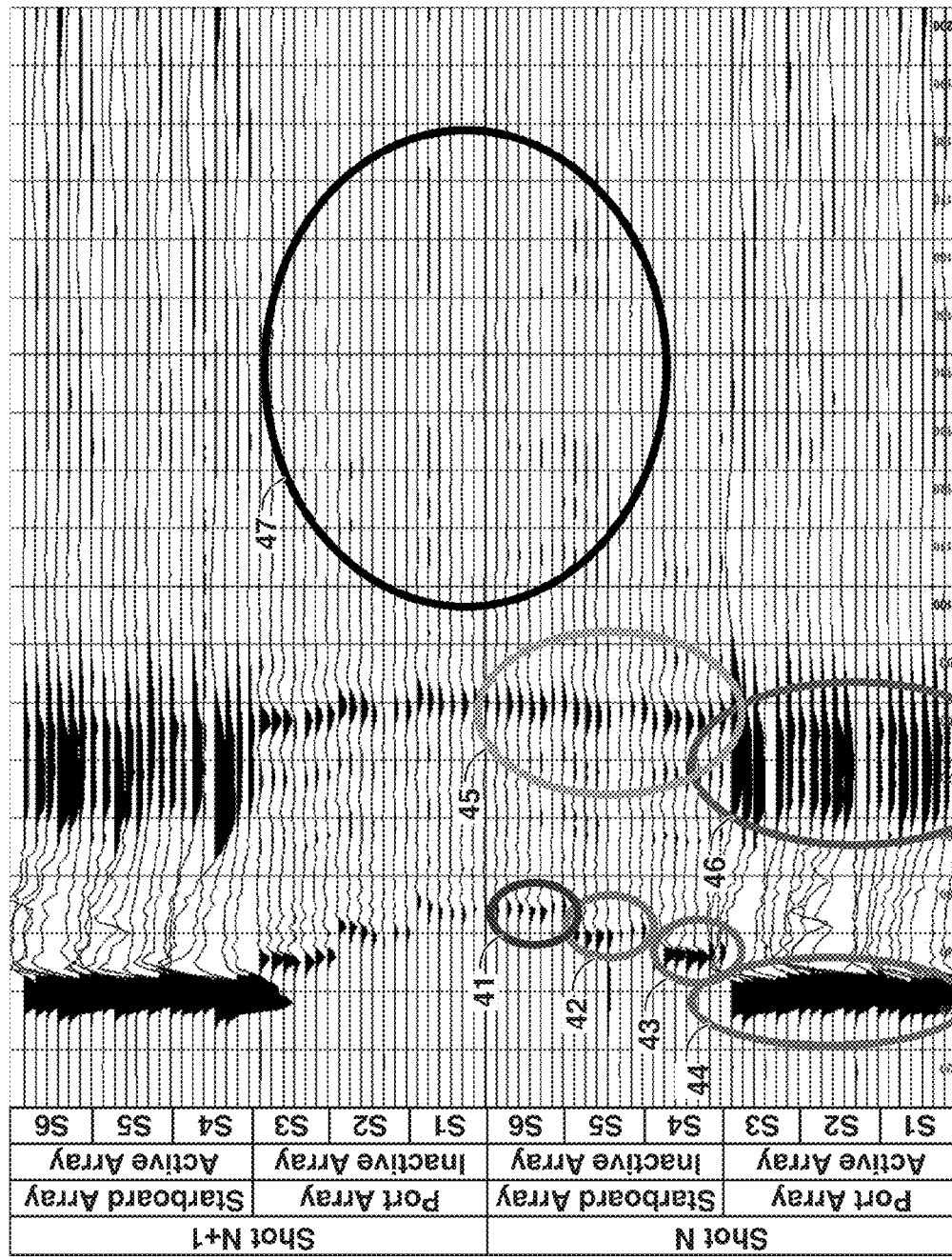
FIG. 4 is a trace display of near-field hydrophone signals from two successive shots.

Further explanation of selecting a median or average trace may be helpful to lay readers. This is a process performed one time sample at a time. Consider FIG. 4 again. The horizontal axis is time. The traces extend horizontally across the drawing, providing relative amplitude displays. The traces appear continuous, but actually are discrete samples, because data are collected in discrete time intervals, called samples. The samples are made large enough to give good statistics, but small enough to give good resolution. There is a trace for each monitor (near-field) receiver. In this case, the receiver configuration was that shown in FIGS. 1-3: two arrays 12, firing in flip-flop fashion, each array alternately the "active" array, then the "inactive" array. The arrays are labeled "port" or "starboard" according to the standard nautical terminology. Each array has three strings 14, e.g. S1, S2 and S3. Each string has seven air guns 32, evidenced in FIG. 4 by the seven data traces associated with S1 and the same for each other string. FIG. 4 shows the near-field monitor data for two consecutive shots, labeled Shot N and Shot N+1.

With this background, an example of selecting a median trace or some type of average trace is given next. This is done on a sample-by-sample basis. Consider, for example, a time sample occurring in the middle of when the direct arrivals 44 are being recorded by the port array monitors for shot N (or the starboard array monitors for shot N+1). Consider the bottom trace in FIG. 4 as an example. This trace is recorded by the monitor sensor for one of the air guns in string S1 of the port array. The trace's amplitude in the time sample being considered is noted. Next, the amplitude for the same time sample corresponding to the same gun in the same string (S1) in the port array is noted for shot N+2, N−2, N+4, N−4, and so on, typically utilizing all the data acquired along that source line. None of these other shot records are shown in FIG. 4 for space reasons. If N shots were fired along the line, one now has N/2 numbers from which a median value is selected (or some type of average is computed). That value becomes the value of the common trace for the time sample in question, and that is how the common trace may be computed in step 83 of FIG. 8. The common trace will never be identical to any actual data trace; for example, the median value will invariably not come from the same trace for every time sample. In the example just given, the data were sorted into common station gathers in step 82 of FIG. 8. Extending the approach to common string gathers or common array gathers is obvious. The importance of the repeatability of each shot, and shooting long lines of many identical shots can readily be appreciated, particularly for the common station gathers, which provide the best spatial resolution.

This process is typically repeated for every time sample to construct a common trace. As time increases to the right in FIG. 4, one can see the negative dip and bounce back that occurs in each trace in oval 44 (for example), just after the direct arrivals. This will readily be identified by the practitioner in the technical field as the reflection off the air-water interface, where a 180° phase reversal occurs. Note how consistently this occurs at every station monitor in the active array. Like the direct arrival, this is a common component that will figure prominently in the computation of the common trace, and hence be largely subtracted out at step 84 of FIG. 8. Similarly, all coherent features in the data become greatly attenuated by the present inventive method.

The spatial interval over which the common signals are computed for each sorted gather should in general be as long as possible. Typical seismic line lengths of 6 km to 18 km are desirable. In cases where the source array geometry or hardware changes during a seismic line, multiple common signals will need to be computed for the seismic line. Reducing the spatial length over which the common signal is computed degrades the estimate of the common signal because the effectiveness of the method depends on the subsurface signals being the least common signal recorded by the near-field sensors (because the subsurface signals, due to the relatively irregular surfaces of the reflectors, can typically be expected to exhibit a lower degree of spatial coherency then the direct arrivals, surface reflections and water bottom reflections).

Figure 9:
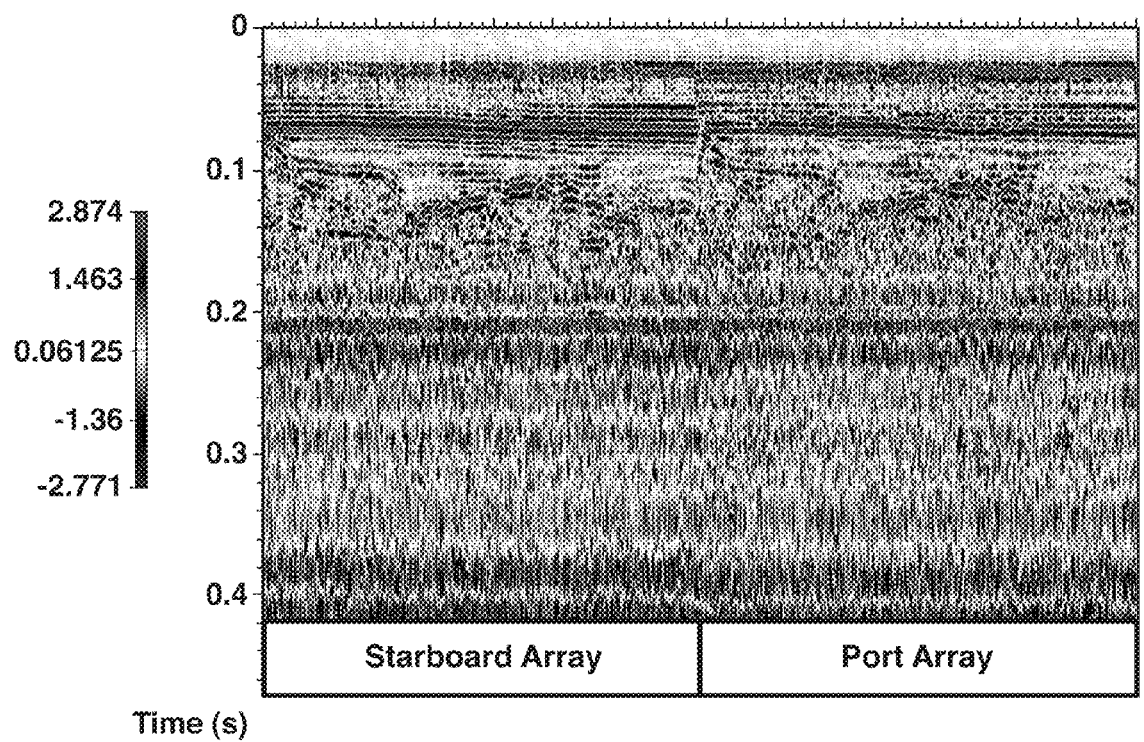
FIG. 9 shows a vertical sum of near-field hydrophones for the active array after median subtraction by gun station.
Figure 10:
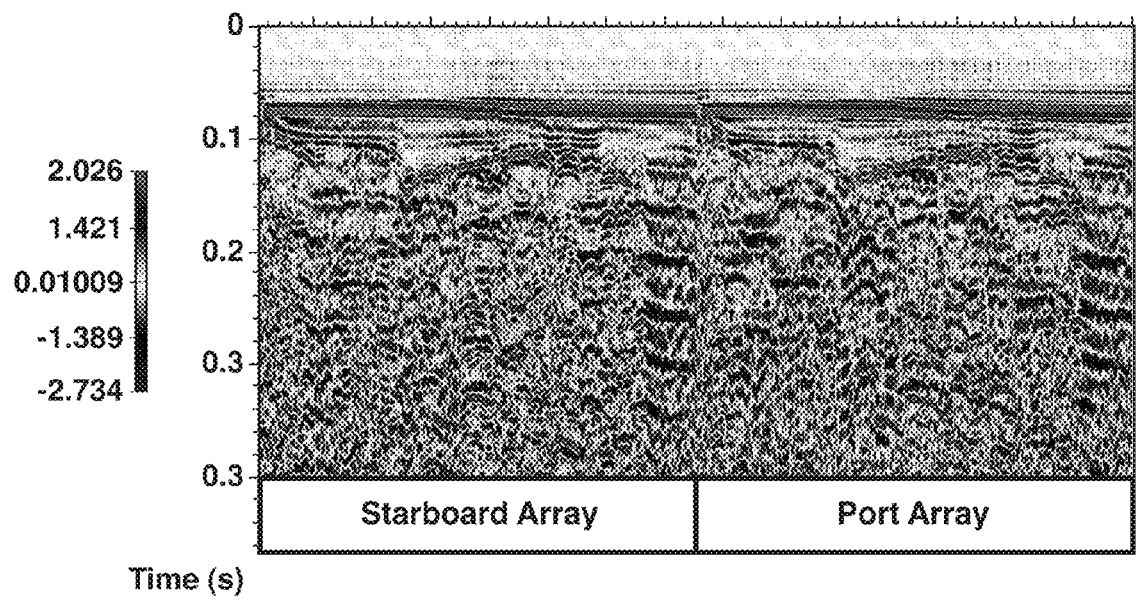
FIG. 10 shows a vertical sum of near-field hydrophones for the inactive array after median subtraction by gun station.

Once the common signals have been estimated, at step 84 the common signal for each gather is subtracted from its associated gather, yielding the desired zero-offset data. Both the data from the active array sensors and the data from the inactive array sensors are useful. The former have minimum offset, but the latter have better signal-to-noise. The inventive method can be considered to be finished at this point. However, it is often desirable to sum the individual traces. Summing improves the signal-to-noise ratio but increases the positional uncertainty of the summed trace. If this alternative is selected, at step 85, the resulting data traces are sorted to gathers such as common midpoint or common shotpoint gathers. At step 86, these gathers are then vertically summed and displayed. Examples of such vertical sums are shown in FIGS. 9 and 10. These drawings are respectively generated from near-field hydrophones for the active array (FIG. 9) and the inactive array (FIG. 10). Each display is divided into the near-zero offset traces computed for the port and starboard source arrays. These profiles define three lines: 1) directly beneath the port array, 2) directly beneath the starboard array and 3) a line halfway between the port and starboard arrays. The distance between adjacent points for the first two lines is the nominal shotpoint interval for the survey. For the third line, the distance between adjacent points is one-half the survey's nominal shotpoint interval.

Figure 5:
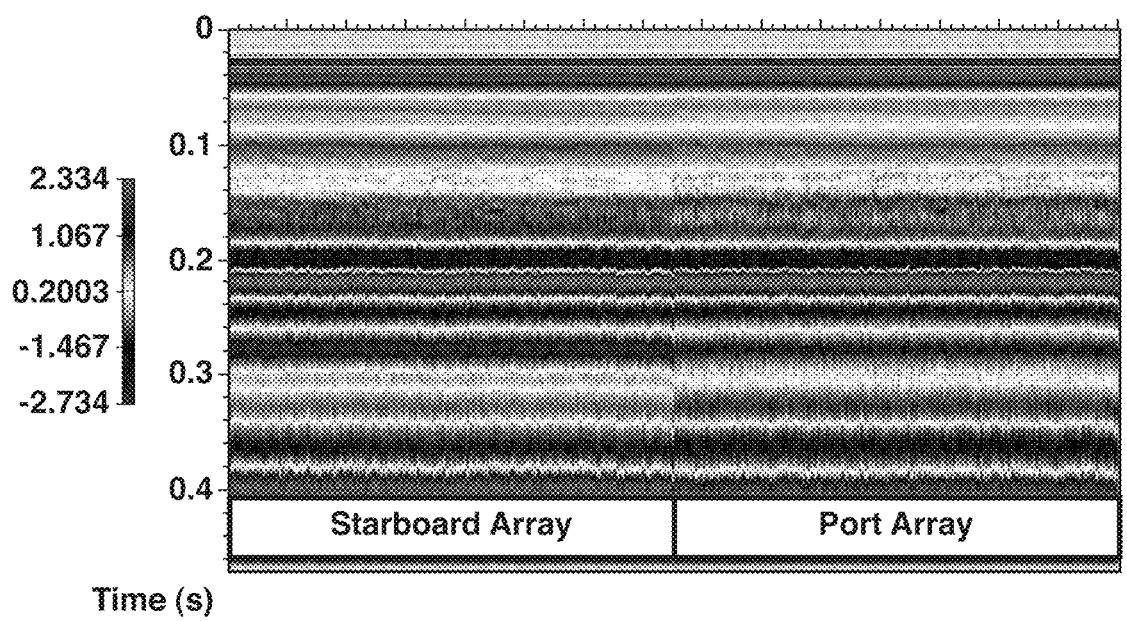
FIG. 5 shows a vertical sum of near-field hydrophones for the active array.
Figure 6:
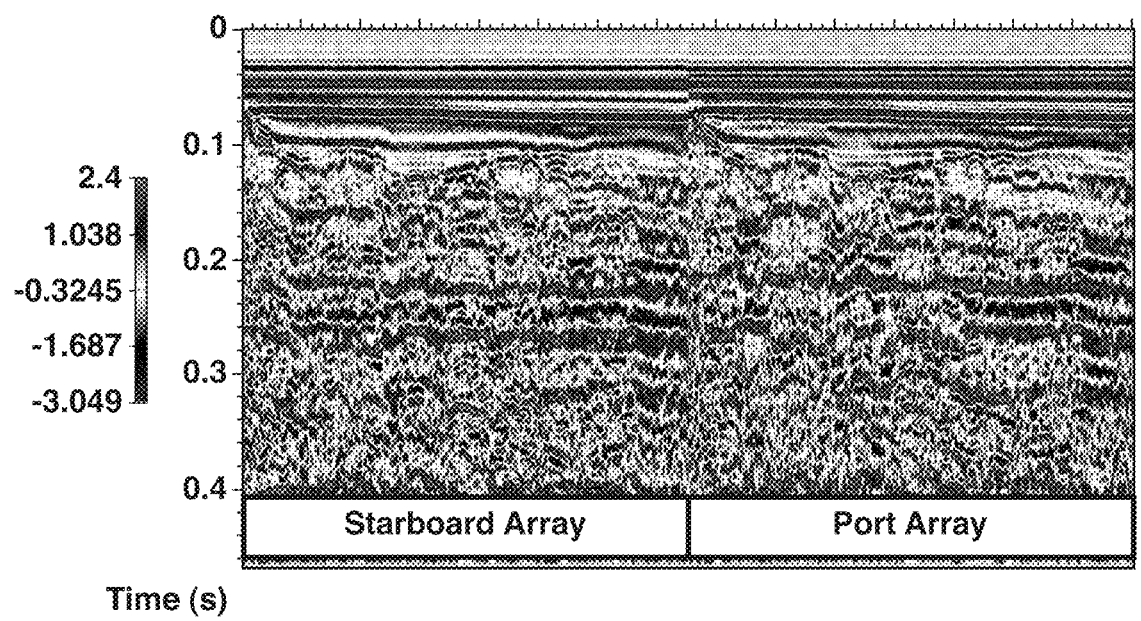
FIG. 6 shows a vertical sum of near-field hydrophones for the inactive array.
Figure 7:
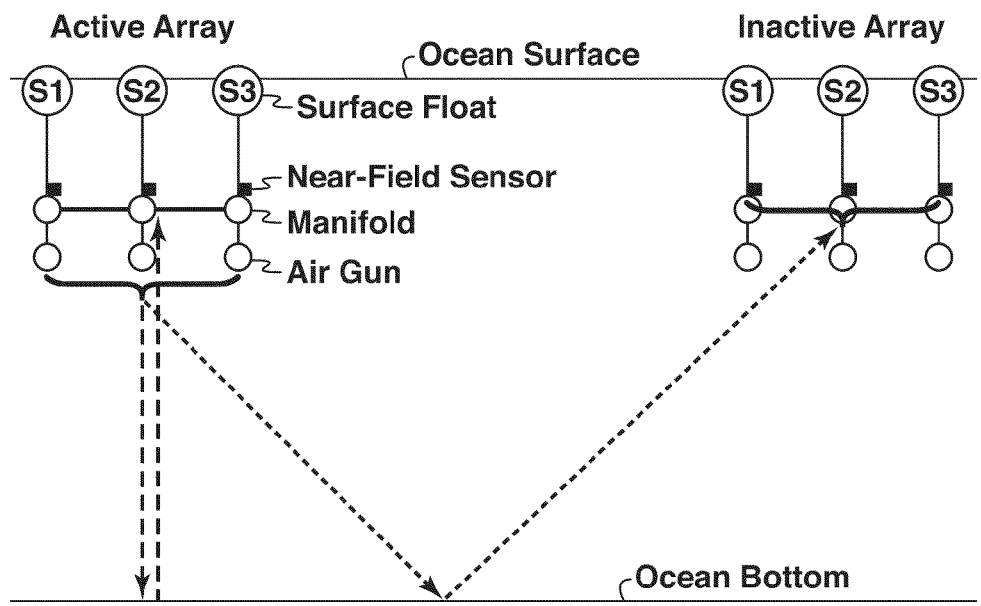
FIG. 7 is an inline view of a vertical cross section of a typical air gun source using two air gun arrays with two of the downward going travel paths indicated.

FIGS. 9 and 10 show that the invention works. They are directly comparable to the data shown in FIGS. 5 and 6. FIG. 9 is the data shown in FIG. 5 after the present inventive method has been applied to remove the direct arrivals from the air guns. FIG. 10 is the data shown in FIG. 6 after the present inventive method has been applied to remove the direct arrivals from the air guns. The water bottom can be identified at approximately 0.06 s in these drawings. In these data displays, horizontal events that do not change across the figures represent the residual energy from the direct arrival of the air gun energy at the sensors in the arrays and from the reflections of the air gun energy from the ocean surface and the ocean bottom. These unchanging, horizontal events are more prevalent in FIG. 9 because these traces are derived from the sensors that are associated with the active array. In FIG. 9, the horizontal event around 0.2 s is residual direct arrival energy from the air gun bubble that the present inventive method did not completely remove, and the same occurs at 0.4 s. (As with any estimation and subtraction style signal processing, the undesired signal can never be perfectly attenuated. Additional signal processing may allow the bubble signals seen in FIG. 9 to be attenuated even further.) In FIG. 10, this horizontal energy is significant only between 0 and 0.06 s. More of the direct arrival energy has been removed from the inactive array because the direct arriving energy is much smaller for the inactive array than for the active array (see FIG. 4).

The invention's ability to attenuate the undesired direct arrivals from the active air gun array is dependent on how well the principal source parameters (e.g. gun depth, gun geometry, air pressure, etc.) are constrained during data acquisition and on the spatial coherence of the desired signal (i.e. the subsurface signal). If the subsurface geology is structurally a series of perfectly flat layers, the method will degrade badly. Luckily the marine near-surface can generally be characterized as a rugose surface with sedimentary infill which creates a relative flat water bottom.

The surface reflectivity and the water bottom reflectivity will vary spatially, but can generally be expected to vary much less than the near-surface geology. The present inventive method is essentially invariant to water depth. The water depths for the data in FIGS. 9 and 10 were approximately 30 m. Experience has shown that the present inventive method produces near-zero offset data that, compared to conventional seismic acquisition, have a broader frequency band with a significant improvement in the definition of the near surface geology at greater water depths, e.g. approximately 100 m.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. The examples given have mostly used the common twin array configuration with its alternating active and inactive arrays. It should be appreciated however that the method can be applied to data from a single near-field monitor receiver, and hence the equipment deployed can be as little as a single source with a single monitor receiver located near by. Moreover, the monitor receiver seismic data records used may be limited to as little as one monitor receiver seismic data record per source shot.

References

Amundsen, "Linear inversion for source signatures from ministreamer data," *The Leading Edge* 19, 40-43 (2000).

Brink et al., "The value of near field hydrophone measurements for monitoring source signature variations," *EAGE 61st Conference Expanded Abstracts*, session 6-09 (1999).

Hargreaves, "Far-field signatures by wave field extrapolation," *SEG Expanded Abstracts* 3, 290-291 (1984).

Hegna, "Method for detecting air gun faults in a marine seismic source array," U.S. Patent Application Publication No. 20080175102 (2008).

Kragh et al., "Source signature estimation—attenuation of the sea-bottom reflection error from near-field measurements," *First Break* 18, 260-264 (2000).

Kragh, "Zero-offset seismic trace construction," PCT Patent Application Publication No. WO 2008/025944 A1 (2008).

Mathison et al., "Marine seismic exploration," Patent No. GB2172997 (1986).

Parkes et al., "The signature of an air gun array: Computation from near-field measurements including interactions—Practical considerations," *Geophysics* 48, 105-111 (1984).

Ziolkowski and Johnston, "Marine seismic sources: QC of wavefield computation from near-field pressure measurements," *Geophysical Prospecting* 45, 611-639 (1997).

The invention claimed is:

1. A method for acquiring zero-offset seismic data from a marine survey, said method comprising:
   (a) obtaining seismic data from a survey wherein the survey used one or more monitor receivers to monitor source signature, and the data obtained comprise a seismic data record from each monitor receiver, each seismic data record including a data trace for each of two or more shot locations along a source line;
   (b) for each seismic data record, estimating a common signal present in each data trace of the seismic data record, wherein the common signal is computed from a seismic data record from a single monitor receiver without use of any traces from a seismic data record from any other monitor receiver; and
   (c) removing the estimated common signal from each seismic data record, thereby generating at least one seismic data record of substantially zero-offset data.

2. The method of claim 1, wherein each monitor receiver was located according to a criterion favoring close proximity to a source being monitored.

3. The method of claim 2, wherein said seismic survey uses survey receivers apart from the monitor receivers, said survey receivers being located farther than the monitor receivers from survey source stations.

4. The method of claim 1, wherein the monitor receivers are either pressure sensors or particle motion sensors.

5. The method of claim 1, wherein substantially zero-offset means offset less than 25 meters.

6. The method of claim 1, wherein estimating a common signal present in each seismic data record comprises:
   estimating a near-field source signature;
   selecting a sort order from a group consisting of common source array gathers, common source string gathers and common source station gathers;
   sorting each source signature into the selected sort order; and
   estimating a common signal for each sorted gather using for each time sample an average trace value, a median trace value, a first principal component value, or another statistical measure.

7. The method of claim 6, wherein the sort order is selected based on balancing optimizing signal-to-noise ratio of computed near-zero offset data vs. minimizing spatial uncertainty associated with the near zero offset data.

8. The method of claim 6, wherein removing the estimated common signal from each seismic data record is subtracting the common signal from each trace in each gather.

9. The method of claim 1, wherein the survey used one monitor receiver for each source, or source string, or source array.

10. The method of claim 1, wherein the estimated common signal corresponds to a combination of surface reflections, water bottom reflections and direct arrivals.

11. The method of claim 1, further comprising using the zero offset data in processing data acquired from survey receivers other than monitor receivers, and predicting hydrocarbon potential from the processed survey data.

12. A method for prospecting for hydrocarbons in a marine environment, comprising:
   (a) obtaining seismic survey data;
   (b) using a method of claim 1 to transform the survey data to substantially zero offset data;
   (c) using the substantially zero-offset data in processing or interpreting the survey data to transform the survey data into an earth model; and
   (d) using the earth model to predict hydrocarbon potential.

13. The method of claim 12, wherein the substantially zero-offset data are used in processing or interpreting for trace interpolation for amplitude-vs.-offset analysis or for surface reflection multiples elimination.

14. The method of claim 1, further comprising vertically summing common midpoint or common shot point gathers of seismic data traces resulting from (c).

15. The method of claim 1, wherein the monitor receiver seismic data records used are limited to one monitor receiver seismic data record per source shot.

* * * * *